Jan. 19, 1943.   F. KREIS   2,308,926
PAWL FREEWHEEL
Filed May 15, 1941

Inventor:
Friedrich Kreis,
by Pierce & Scheffler,
Attorneys.

Patented Jan. 19, 1943

2,308,926

UNITED STATES PATENT OFFICE 2,308,926

PAWL FREEWHEEL

Friedrich Kreis, Chemnitz, Germany; vested in the Alien Property Custodian

Application May 15, 1941, Serial No. 393,642
In Germany March 26, 1940

4 Claims. (Cl. 192—46)

A pawl-freewheel is known, in which the pawls are equipped with guiding slides in their oscillating ends bearing in the engaged position against abutments of the outer freewheel element, and in which rollers, bearing against the inner wall of the outer freewheel element, are mounted on axles which, when the rollers are driven, hinder the pawls from oscillating when the outer freewheel element is driven, that is in the freewheel position, and which when the inner freewheel element, mounted on the wheel axle, is driven, permits of a swinging out of the pawls about their journalling provided on the other end.

In this construction the rollers, the axles of which are journalled in the guiding slides of the pawls, serve at the same time as bearing bodies between the inner and outer freewheel elements. As further bearing bodies for the outer freewheel element on the inner freewheel element serve additional rollers, on the axles of which the non-oscillating ends of the pawls are mounted. This freewheel construction has the inconvenience, that in the freewheel position the bearing bodies cannot roll and therefore the freewheel mechanism is exposed to strong wear.

The invention overcomes this inconvenience in that for some of the means employed in the known construction other means are substituted, in that the rollers journalled in the guiding slides of the pawls run only on the inner wall of the outer freewheel element, this freewheel element being supported on the inner freewheel element by bearing rollers rolling in the freewheel position, and that the pawls are hingedly mounted at their non-oscillating end on the inner freewheel element.

In this instance the pawls are preferably slit at their oscillating ends and carry between the arms produced by the slitting and equipped with guiding slides, by means of axle pins engaging in the guiding slides, the rollers running on the inner wall of the outer freewheel element, said rollers being conducted at the side in an annular groove of the outer freewheel element. The inner freewheel element has semi-circular recesses in which the correspondingly constructed non-oscillating ends of the pawls are supported.

Figure 1:
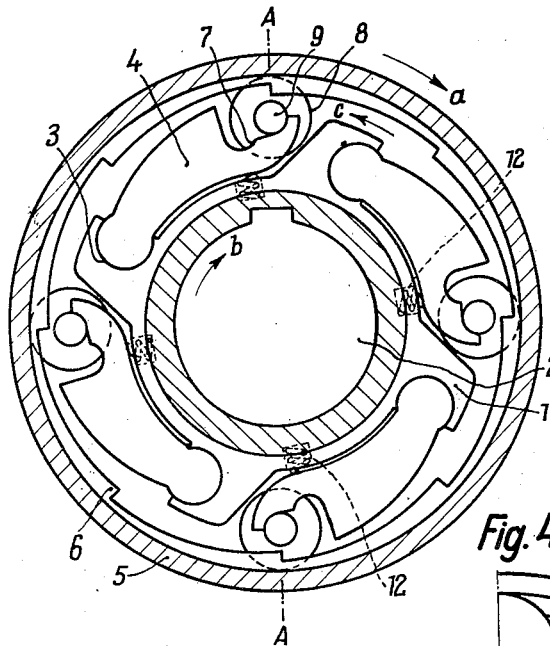
Figure 3:
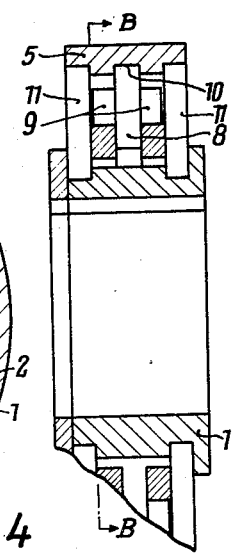
Figure 2:
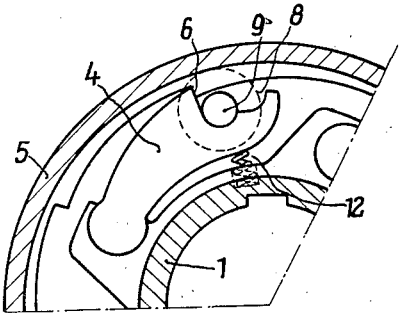
Figure 4:
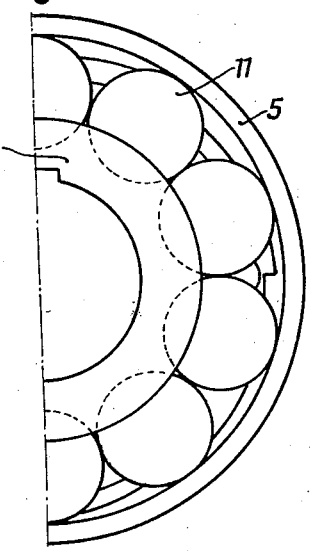

An embodiment of the invention is diagrammatically illustrated by way of example in the accompanying drawing, in which Fig. 1 shows the freewheel in side section taken along the line B—B of Fig. 3, Fig. 2 a portion of Fig. 1 the pawl being engaged, Fig. 3 a section on line A—A of Fig. 1, Fig. 4 a portion of the closed side elevation of the freewheel.

The inner freewheel element 1 which is connected with the axle at 2 so that it can turn the same has recesses 3 in its outer circumference in which the correspondingly constructed ends of the pawls 4 rest oscillatably or are supported. The outer freewheel element 5 has on its outer wall stops 6 against which the pawls 4 bear when they are in the engaged position, as shown in Fig. 2. Each pawl 4 has on its free end a cam trackway 7 in which a wheel 8 can move from the one into the other extreme position by means of the carrier pins 9 extending from both sides. These wheels 8 engage on the outer side in a groove 10 milled in the wall of the outer freewheel element 5, said groove serving for the lateral guiding of the wheels. The outer freewheel element 5 is supported on the inner freewheel element 1 by rollers 11, so that a rolling mounting is ensured.

The operation is as as follows: If the outer freewheel element 5 moves in the direction of the arrow $a$ shown in Fig. 1 relative to the inner freewheel element 1, the guide wheels 8 are drawn along by the outer freewheel element 5 in assuming relative to the pawls 4 the position shown in Fig. 1, and prevent these pawls from oscillating in outward direction. The supporting rollers 11 permit then a free rolling of the outer freewheel element 5 relative to the inner freewheel element 1. If, however, the freewheel is driven from the axle 2, so that the inner freewheel element 1 in the direction of the arrows $b$ moves ahead of the outer freewheel element 5, the wheels 8 are oscillated in opposite direction by the pressure exerted by the pawls 4 the axles 9 of the wheels 8 moving in the direction of the arrow $c$ until they encounter the rear flange of the cam trackway 7. To the pawls 4 a tipping moment is thus imparted on the one hand by the abutment of the wheels and on the other hand by their own centrifugal force, by which tipping moment the rear ends of the pawls roll in the recesses 3 of the inner freewheel element 1 and the fore ends are oscillated, whereupon these front ends bear against the abutments 6 of the outer freewheel element 5 as shown in Fig. 2. In order to assist the oscillating movements of the pawls, springs 12 are provided between the front end of the pawls and the inner freewheel element 1.

I claim:

1. A pawl freewheel which comprises an inner driving element and an outer driven element concentrically mounted thereon for rotation relative thereto and a clutch for locking said driving and driven elements together including pawls pivotally mounted on the outside of said driving element, means mounted on the inside of said driven element for engaging said pawls to prevent relative rotation of said elements in one directional sense and to permit relative rotation of said elements in the other directional sense, and means for engaging and disengaging said pawls comprising a cam trackway on the oscillating end of said pawl including wheel stops defining said cam trackway between the pivot and the engaging end of said pawl, a circular trackway adjacent said cam trackway upon the inner surface of said outer element, and a wheel floating between said cam trackway and said circular trackway; the wheel stop closer to the pawl pivot engaging with the wheel at a point nearer the circular trackway than the pivot axis of said pawl, whereby a torque tending to turn said pawl into engagement with said pawl engaging means is imposed upon said pawl when said stop and said wheel are in engagement, the distances between the trackways adjacent said wheel stop which is nearer the pawl pivot and adjacent the other wheel stop being respectively sufficiently great for and insufficient for engagement of the pawl.

2. A pawl freewheel as defined in claim 1 in combination with spring means yieldingly biasing said pawl into engagement with said pawl engaging means.

3. A pawl freewheel as defined in claim 1 in which said pawl is bifurcated along said cam trackway at its oscillating end providing a radially extending slot, the circular trackway comprises a circular slot in radial alignment with the slot in said pawl, and said wheel comprises a discoid central section having axially extending pins, the central section of said wheel riding freely in the pawl slot and contacting the outer element in said slotted circular trackway and the pins only of said wheel contacting the cam trackway of said pawl.

4. A pawl freewheel as defined in claim 1 in which said pawl is bifurcated along said cam trackway at its oscillating end providing a radially extending slot, the circular trackway comprises a circular slot in radial alignment with the slot in said pawl, and said wheel comprises a discoid central section having axially extending pins, the central section of said wheel riding freely in the pawl slot and contacting the outer element in said slotted circular trackway and the pins only of said wheel contacting the cam trackway of said pawl, and in which the pivot mounting of said pawl consists of a cylinder and sleeve joint.

FRIEDRICH KREIS.